United States Patent [19]
Chiba et al.

[11] Patent Number: 5,589,960
[45] Date of Patent: Dec. 31, 1996

[54] LIQUID CRYSTAL DISPLAY SYSTEM

[75] Inventors: Masao Chiba; Mikio Ishii, both of Saitama, Japan

[73] Assignee: Kansei Corporation, Saitama, Japan

[21] Appl. No.: 359,453

[22] Filed: Dec. 20, 1994

[30] Foreign Application Priority Data

Dec. 20, 1993 [JP] Japan ................................ 5-319781
Mar. 1, 1994 [JP] Japan ................................ 6-031349

[51] Int. Cl.$^6$ .......................... G02F 1/133; G02F 1/1335
[52] U.S. Cl. ........................ 349/76; 349/72; 349/117
[58] Field of Search ........................ 359/53, 86, 40, 359/41, 48, 49, 50, 73

[56] References Cited

U.S. PATENT DOCUMENTS

| | | | |
|---|---|---|---|
| 4,952,032 | 8/1990 | Inoue | 359/86 |
| 5,126,868 | 6/1992 | Kizaki | 359/86 |
| 5,157,525 | 10/1992 | Eaton | 359/86 |
| 5,168,382 | 12/1992 | Tsujikawa | 359/86 |
| 5,208,688 | 5/1993 | Fergason | 359/53 |
| 5,247,378 | 9/1993 | Miller | 359/86 |
| 5,347,382 | 9/1994 | Rumbaugh | 350/53 |

FOREIGN PATENT DOCUMENTS

| | | | |
|---|---|---|---|
| 274391A | 7/1988 | European Pat. Off. | 359/53 |
| 2910571 | 9/1980 | Germany | 359/86 |
| 84/01037 | 3/1984 | WIPO | 359/48 |

*Primary Examiner*—William L. Sikes
*Assistant Examiner*—Tiep H. Nguyen
*Attorney, Agent, or Firm*—Longacre & White

[57] ABSTRACT

A double-layer type super-twisted nematic liquid crystal display system including a liquid crystal display device for displaying characters and/or graphic forms, a compensating liquid crystal device for compensating the optical phase of the liquid crystal display device, a temperature sensor for detecting the ambient temperature of those devices, a light sensor for calculation of the display contrast of the liquid crystal display device, drive voltage control circuits for controlling the drive voltages applied to the liquid crystal display device and the compensating liquid crystal device, and a displaying light source. In the display system, the drive voltages applied to the liquid crystal display device and compensating liquid crystal device are adjusted according to the calculation of contrast, whereby the display is high in contrast at all times independently of the ambient temperature.

7 Claims, 4 Drawing Sheets

LIQUID CRYSTAL DISPLAY SYSTEM

BACKGROUND OF THE INVENTION

1. Field of the Invention

This invention relates to a liquid crystal display system, and more particularly to a double-layer type super-twisted nematic liquid crystal display system.

2. Discussion of the Related Art

A conventional display means employed in an automobile's head-up display system is of a seven-segment type using fluorescent display tubes, because the display must be high in luminance. The fluorescent display tubes of the segments are selectively turned on to display, for instance, a vehicle speed and the number of revolutions per minute.

In the display means, the fluorescent display tubes emit light high in luminance. Hence, the display means is advantageously employed, for instance, for an automobile's head-up display system which makes display by reflecting light with a combiner. However, since the display means is of a seven-segment type, it is limited in the form of display; that is, what can be displayed by the display means is mainly numerical data. More specifically, it is unable for the display means to display a variety of data including characters and graphic forms. That is, the display means is rather inadequate as means for displaying a variety of pieces of information.

In order to eliminate this difficulty, a dot-matrix type transmission liquid crystal display device is employed as the display means in the head-up display system. In this case, in order to have a clear display, it is essential to use a liquid crystal display device which is able to provide a display sufficiently high in contrast.

There are available a variety of liquid crystal display devices, such as, a twist nematic type liquid crystal display device, a ferroelectric liquid crystal display device, and a phase transition type liquid crystal display device. Among those display devices, for instance, a super-twisted nematic liquid crystal device is considered to be relatively high in contrast. However, maximizing the display contrast of the super-twisted nematic liquid crystal device gives rise to various problems as follows:

FIG. 1 shows a conventional super-twisted nematic liquid crystal display system. The display system includes: a dot-matrix type super-twisted nematic liquid crystal display device (hereinafter referred to merely as "a liquid crystal display device", when applicable) 1; and a compensating liquid crystal device 2. The compensating liquid crystal device 2 optically eliminates a coloring phenomenon in the liquid crystal display device 1 which is caused by the phase difference in the direction of advance of light therein; that is, the device 2 makes the display monochromatic, thereby to increase the contrast. The twist angle of the compensating liquid crystal device 2 is opposite in direction to the twist angle of the liquid crystal display device 1. The display system further includes: a drive voltage control circuit 3 for adjusting a drive voltage applied to the liquid crystal display device 1; a temperature sensor 4 for detecting the ambient temperature of the liquid crystal display device 1; a display control circuit 5 for allowing the liquid crystal display device 1 to display characters and/or graphic forms; and a light source 6 which irradiates the liquid crystal display device 1 in a transmission mode.

In the display system thus organized, in response to signals from the display control circuit 5, the liquid crystal display device 1 displays characters and/or graphic forms. The display on the display device 1 is irradiated by the output light of the light source 6 in a transmission mode. When the display thus irradiated passes through the compensating liquid crystal device 2, the light twisted by the liquid crystal display device 1 is twisted back, which eliminates the elliptic light polarization attributing to the phase difference, and the variations in direction of the light polarization due to the wavelength of light. As a result, the display is made monochromatic; that is, the coloring phenomenon is eliminated, so that the display is improved in contrast.

In the conventional liquid crystal display system, the display (or image) on the liquid crystal display device 1 has a density characteristic as shown in FIG. 2.

That is, in general, in order to make a display high in contrast, the following expressions must be satisfied:

$$V_{on} \geq V_{th} + \Delta V$$

$$V_{off} \geq V_{th}$$

where $V_{th}$ is a threshold voltage with which the liquid crystal starts to provide an electro-optic effect, $V_{on}$ is an effective voltage of a selected point (or a light-on picture element), and $V_{off}$ is an effective voltage of a not-selected point (or a light-off picture element).

This will be described with reference to FIG. 2 in more detail.

As the applied voltage is gradually increased from zero, the selected point is increased in image density. When the applied voltage is further increased, the not-selected point is also increased in image density. If it is assumed that the selected point has an image density of 10% with a voltage $V_{th1}$, and an image density of 50% with a voltage $V_{50}$, and the not-selected point has an image density of 10% with a voltage $V_{th2}$, then the voltages with which an image high in contrast can be displayed are ranged from $V_{50}$ to $V_{th2}$. This is generally called an "operating voltage range".

Thus, in order to improve the display contrast, the applied voltage should be set to a value in the above-described operating voltage range. On the other hand, in the case of a liquid crystal display system which is generally used, the above-described image density characteristic depends on the ambient temperature of the liquid crystal display device; that is, it is on the low voltage side when the ambient temperature increases, and it is on the high voltage side when the ambient temperature decreases. In order to overcome this difficulty, a temperature sensor such as a thermistor is employed to perform a temperature compensation according to the temperature characteristic of the drive voltage of the liquid crystal display device. However, since the temperature characteristic of the drive voltage is non-linear, the adjustment of the temperature characteristic by using the temperature sensor such as a thermistor is limited. On the other hand, the threshold voltage of the liquid crystal display device drifts, which makes it difficult to provide a suitable drive voltage, and accordingly to display a high contrast image.

SUMMARY OF THE INVENTION

Accordingly, an object of the invention is to eliminate the above-described difficulties accompanying a conventional liquid crystal display system.

More specifically, an object of the invention is to provide a liquid crystal display system in which the ambient temperature of the liquid crystal display device is detected, and the temperature thus detected is utilized to provide liquid crystal drive voltages with which the display made by the liquid crystal display device and the compensating liquid crystal device provide are highest in contrast at all times independently of the ambient temperature.

In order to achieve the foregoing object, the invention provides a double-layer type super-twisted nematic liquid crystal display system including: a dot-matrix type liquid crystal display device for displaying at least one of characters and graphic forms; a compensating liquid crystal device, which has transparent electrodes for retardation adjustment, for compensating an optical phase of the liquid crystal display device; a display control circuit for causing the liquid crystal display device to display, at least one of characters and graphic forms; a temperature sensor for detecting a temperature of an atmosphere in which the liquid crystal display device and the compensating liquid crystal device are set; light detecting means for measuring and calculating a display contrast of the liquid crystal display device; drive voltage control circuits for controlling drive voltages applied to the liquid crystal display device and the compensating liquid crystal device; and a displaying light source, wherein the liquid crystal display device and the compensating liquid crystal device are driven with drive voltages which are adjusted according to the calculation of contrast made with the aid of the light detecting means.

DETAILED DESCRIPTION OF THE PREFERRED EMBODIMENTS

Preferred embodiments of the invention will be described with reference to the accompanying drawings.

First Embodiment

Figure 1:
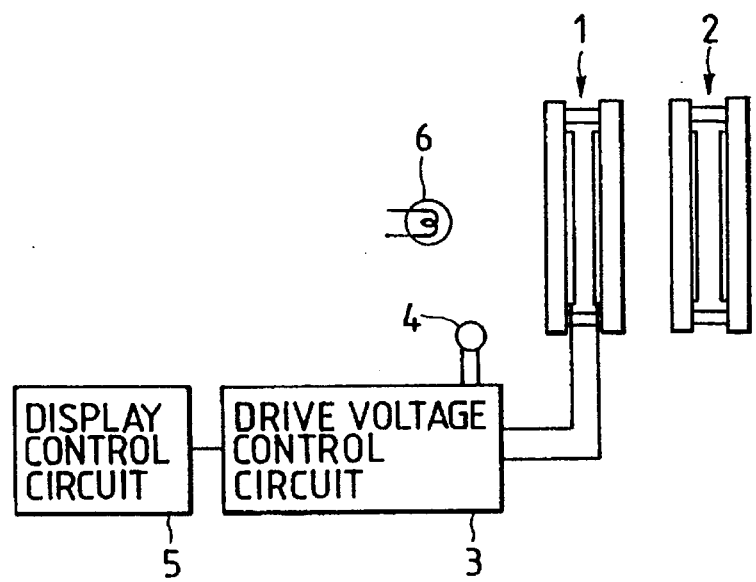
FIG. 1 is an explanatory diagram showing the arrangement of a conventional liquid crystal display system.
Figure 2:
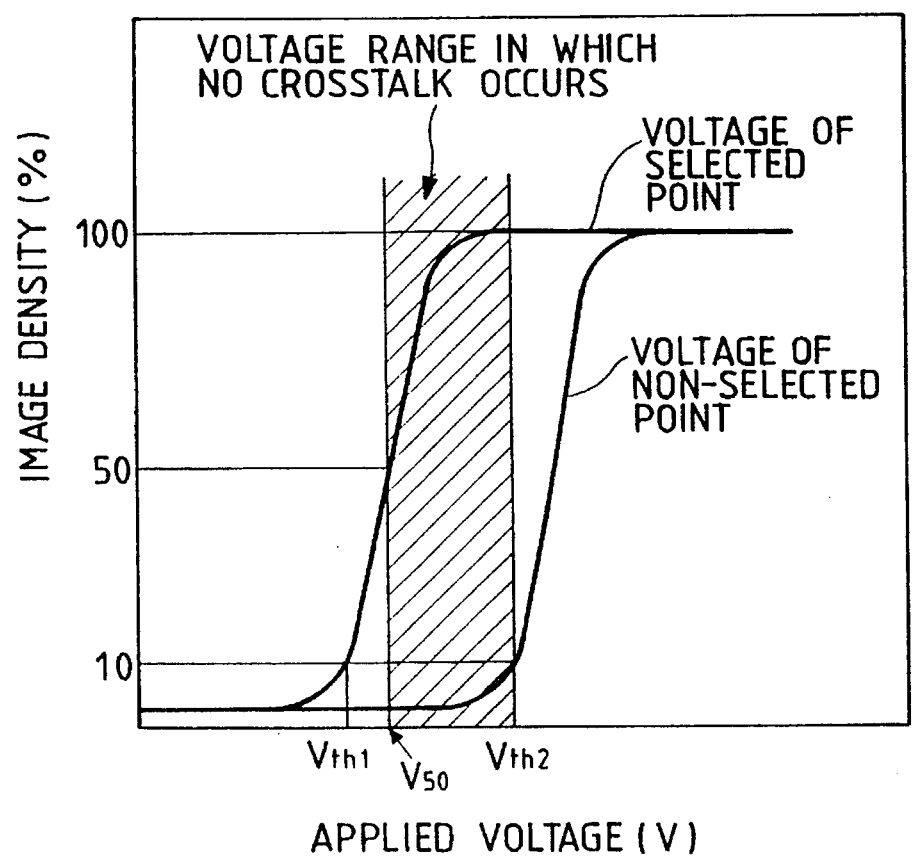
FIG. 2 is a graphical representation indicating the image density characteristic of a liquid crystal display device in the conventional liquid crystal display system.
Figure 3:
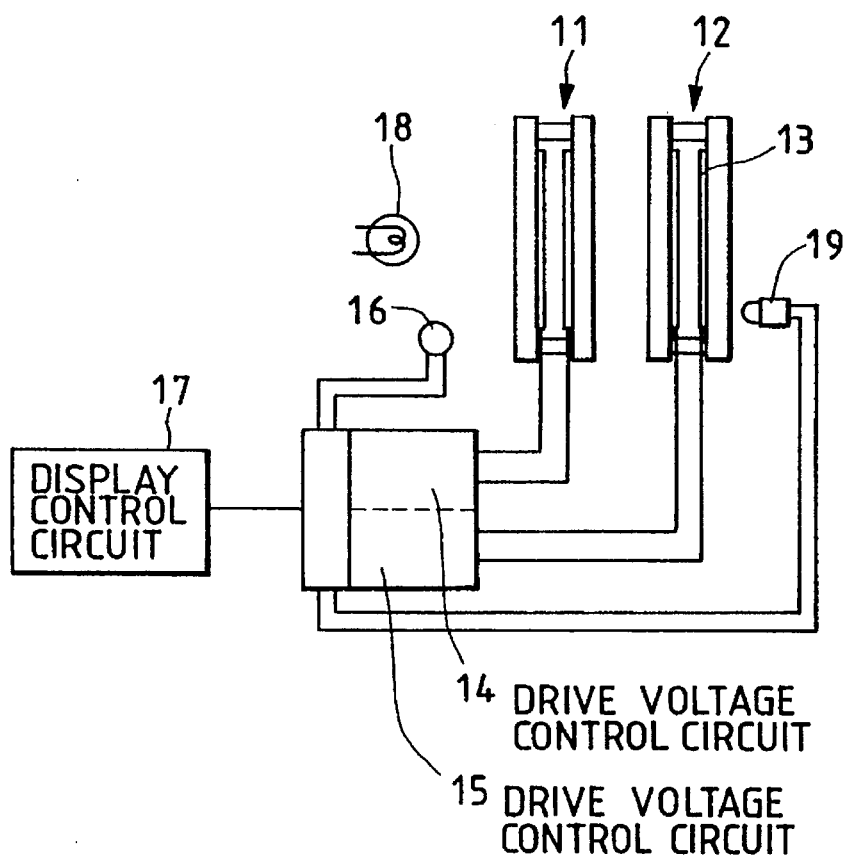
FIG. 3 is an explanatory diagram showing the arrangement of a liquid crystal display system, which constitutes a first embodiment of the invention.

A liquid crystal display system, which constitutes a first embodiment of the invention, as shown in FIG. 3, includes: a dot-matrix type super-twisted nematic liquid crystal display device 11 (hereinafter referred to merely as "a liquid crystal display device", when applicable); a compensating liquid crystal device 12 laid over the front surface of the liquid crystal display device 11, the device 12 having transparent electrodes 13 on its surface and having a twist angle which is opposite in direction to the twist angle of the liquid crystal display device 11; a drive voltage control circuit 14 for adjusting a drive voltage applied to the liquid crystal display device 11; and a drive voltage control circuit 15 for adjusting a drive voltage applied to the compensating liquid crystal device 12. The display system further includes: a temperature sensor 16 for detecting the ambient temperature of the liquid crystal display device 11 to make liquid crystal driving voltages close to the values which are most suitable with the ambient temperature thus detected; a display control circuit 17 for displaying characters and graphic forms on the liquid crystal display device 11; a light source 18 for irradiating the liquid crystal display device 11 in a transmission mode; and a photo sensor 19 for detecting the contrast of a display on the liquid crystal display device 11 observing it through the compensating liquid crystal device 12.

Figure 4:
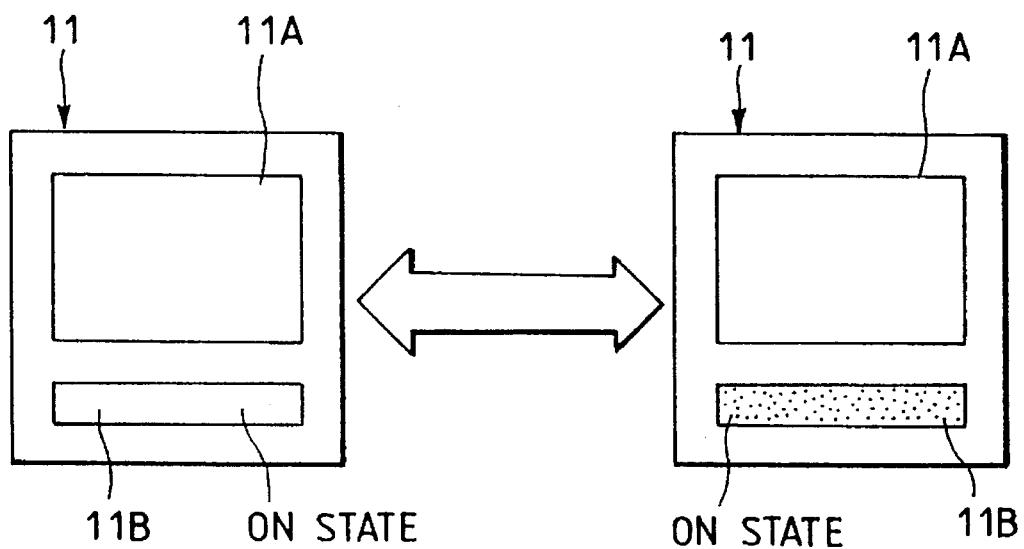
FIG. 4 is an explanatory diagram for a description of a displaying operation performed by the liquid crystal display system shown in FIG. 3.

The liquid crystal display device 11, as shown in FIG. 4, has a data display region 11A for displaying data by using characters and graphic forms, and a luminance measuring region 11B.

The liquid crystal display system thus organized operates as follows:

In response to a signal from the display control circuit 17, characters and/or graphic forms are displayed in the display region 11A of the liquid crystal display device 11. The display in the region 11A is irradiated, in a transmission mode, by the output light of the light source 18. At the same time, the temperature sensor 16 detects the ambient temperature of the liquid crystal display device 11 (the temperature of the circumference where the display system is set), and a drive voltage most suitable for the liquid crystal display device 11; i.e., a drive voltage which makes the contrast of the display on the liquid crystal display device 11 highest is determined from the ambient temperature thus detected.

In addition, when the liquid crystal display device 11 is driven, the ambient temperature of the latter 11 is detected by the temperature sensor 16. On the other hand, while the luminance measuring region 11B of the liquid crystal display device 11 being turned on and off with a suitable period as shown in FIG. 4, the contrast thereof is measured with the photo sensor 19, and the drive voltages of the liquid crystal display device 11 and the compensating liquid crystal device 12 are changed until liquid crystal panel drive voltages are obtained which make the contrast highest. This will be described in more detail.

Figure 5:
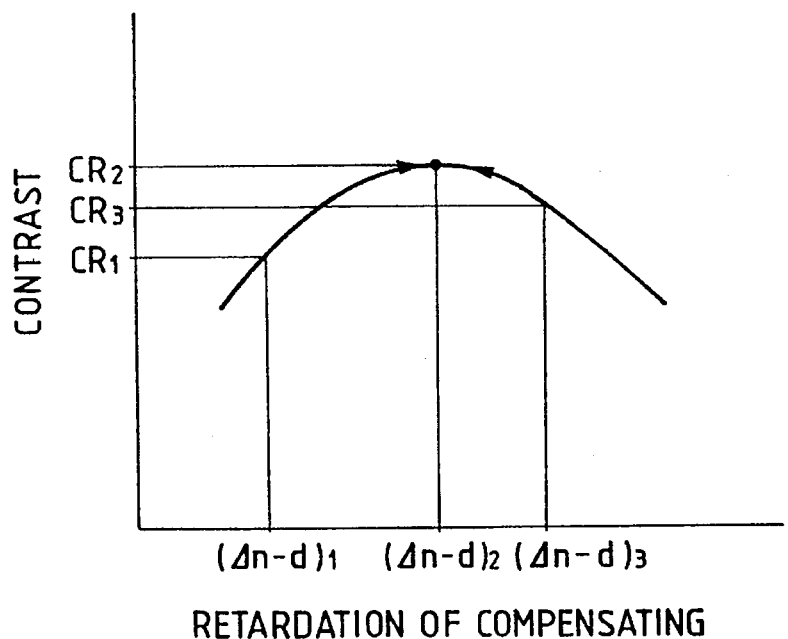
FIG. 5 is a graphical representation indicating a contrast characteristic of a double-layer type super-twisted nematic liquid crystal display system.

In a double-layer type super-twisted nematic liquid crystal display system, the contrast is maximum when the retardation (that is an optical phase difference represented by the production of the difference $\Delta n$ between two refractive indexes $n_l$ and $n_o$ of a liquid crystal molecule and the thickness of the liquid crystal layer—the inclination of the liquid crystal molecule, when regarded as a liquid crystal device, is changed in inclination depending on a voltage applied thereto, and the difference $\Delta n$ of the liquid crystal device is changed, thus affecting the contrast) of the compensating liquid crystal device 12 is at $(\Delta n \cdot d)_2$ which is somewhat lower than the retardation $(\Delta n \cdot d)_3$ of the liquid crystal display device 11 (cf. FIG. 5). The set retardation $(\Delta n \cdot d)$ of the compensating liquid crystal device 12 is generally different from the aimed value $(\Delta n \cdot d)_2$. Hence, even if the contrast of the display on the double-layer type super-twisted nematic liquid crystal display system is measured, and only the drive voltage for the liquid crystal display device is controlled, the maximum contrast cannot be obtained (cf. $CR_1$ and $CR_3$ in FIG. 5). Therefore, in the first embodiment, not only the drive voltage applied to the liquid crystal display device 11 but also the drive voltage applied to the compensating liquid crystal device 12 is changed to set the retardation of the latter 12 to the aimed value $(\Delta n \cdot)_2$, thereby to obtain the maximum contrast $CR_2$.

The voltage control of the liquid crystal display device 11 and the compensating liquid crystal device 12 will be described with reference to FIGS. 3 and 6.

First, drive voltages corresponding to an ambient temperature detected by the temperature sensor 16 are applied to the liquid crystal display device 11 and the compensating liquid crystal device 12.

Figure 6:
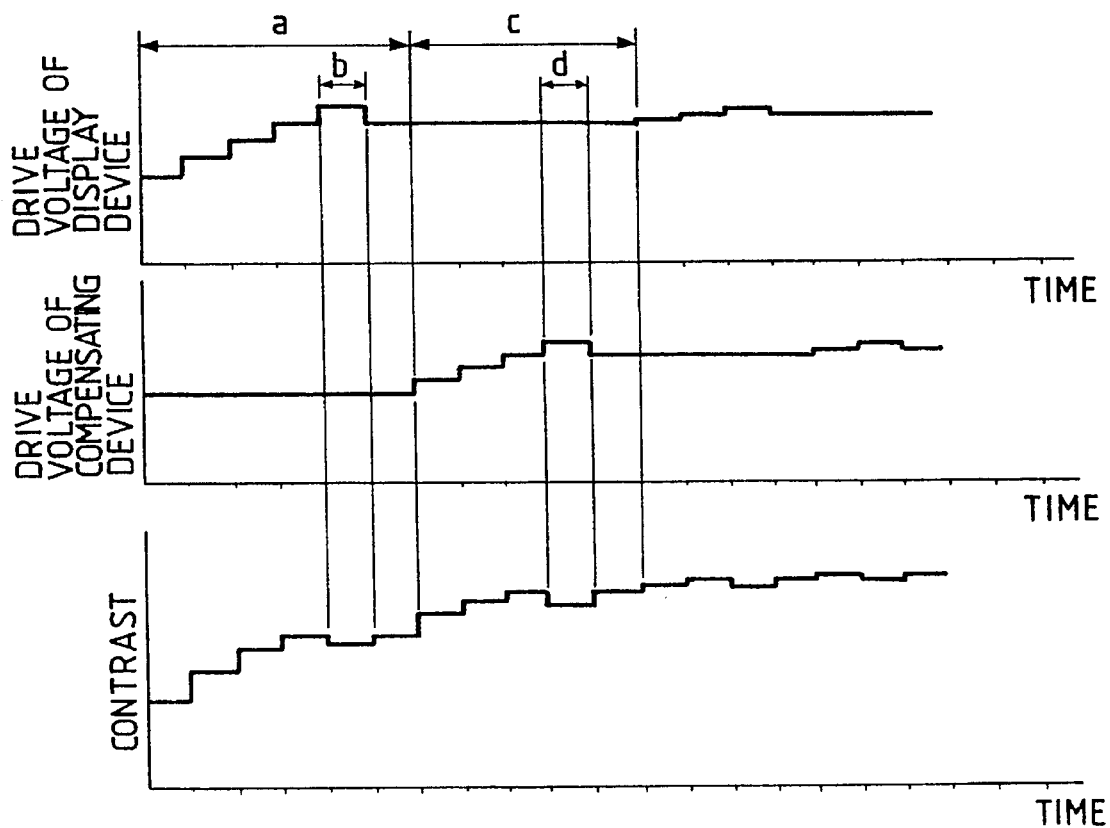
FIG. 6 is a timing chart for a description of the control of voltages applied to the liquid crystal display device and the compensating liquid crystal device in the liquid crystal display system of the invention.

Under this condition, while the contrast of the display on the double-layer type super-twisted nematic liquid crystal display system is being measured, the drive voltage of the liquid crystal display device 11 is increased or decreased (in the case of FIG. 6, the drive voltage is increased) with the drive voltage of the compensating liquid crystal device 12 maintained constant (a in FIG. 6). If this operation decreases the contrast (b in FIG. 6), then the drive voltage of the liquid crystal display device 11 is changed to the preceding value which it had immediately before the operation. Next, similarly as in the above-described operation, while the contrast is being measured, the drive voltage of the compensating crystal liquid device 12 is increased or decreased (in the case of FIG. 6, the drive voltage is increased) with the drive voltage of the liquid crystal display device 11 maintained constant (c in FIG. 6). If this operation decreases the contrast (d in FIG. 6), the drive voltage of the compensating liquid crystal device 12 is returned to the preceding value which it had immediately before the operation.

The above-described operations are repeatedly carried out. As a result, the drive voltages of the double-layer type super-twisted nematic liquid crystal system are so controlled that the contrast is maximum at all times irrespective of the ambient temperatures.

Figure 7:
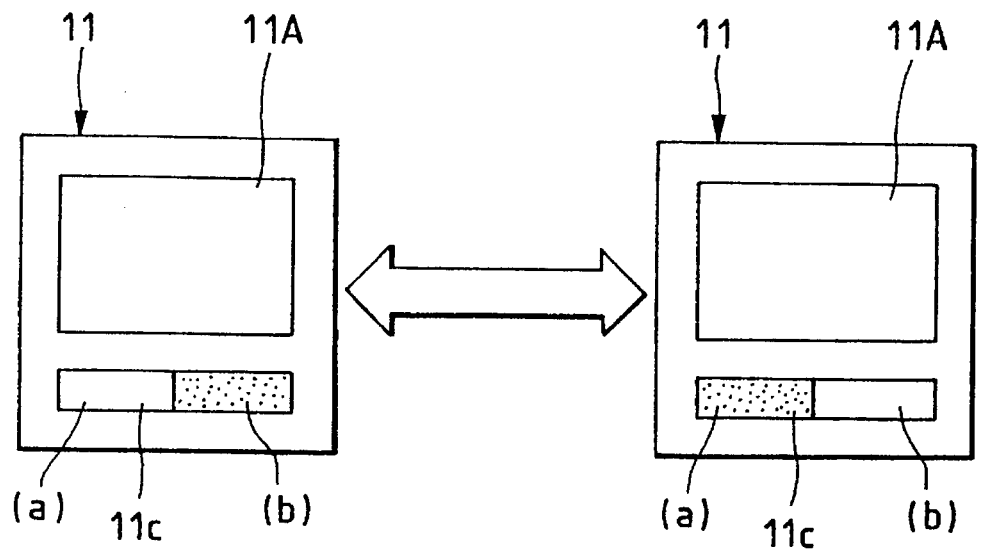
FIG. 7 is an explanatory diagram for a description of a modification of the first embodiment.

FIG. 7 shows a modification of the above-described first embodiment. The modification is obtained by replacing the luminance measuring region 11B of the first embodiment with a luminance measuring region 11C which is designed as follows: The luminance measuring region 11C is divided into two parts, namely, a right part (b) and a left part (a) which are alternately turned on and off with a predetermined period. That is, when the right part (b) is turned on, the left part (a) is turned off; and vice versa. In addition, two photo sensors 19 are provided for those two parts (a) and (b), respectively.

The reason why the right and left parts of the luminance measuring region 11C are turned on and off with the predetermined period is to eliminate a difficulty accompanying a liquid crystal display system, especially a super-twisted nematic liquid crystal display system, that, if the same display is kept for a long time, a so-called "burning" occurs with the region, so that the region becomes different in display characteristic from the other regions. In addition, the reason why the luminance measuring region 11C is divided into the two parts (a) and (b) is to measure the luminance of the two parts in "on"0 and "off" states at the same time, thereby to quickly obtain the most suitable contrast.

If summarized, in the liquid crystal display system designed as described above, the most suitable contrast is obtained as follows: The luminance measuring region 11B (or 11C) of the liquid crystal display device 11 is turned on and off with a suitable period, and the luminances of the luminance measuring region which is in "on" state and in "off" state are measured with the photo sensor 19 (or the photo sensors 19). Then, the drive voltage applied to the liquid crystal display device 11 is controlled so that the ratio of the luminances thus measured; that is, the contrast be maximum. Hence, even if the liquid crystal display device 11 is varied in characteristic when manufactured, or when used for a long time, or the ambient temperature of the liquid crystal display device 11 is variable, the drive voltage of the liquid crystal display device 11 is controlled according to those variations, so that the best contrast is obtained at all times.

Second Embodiment

Another liquid crystal display system, which constitutes a second embodiment of the invention, will be described with reference to FIG. 8.

Figure 8:
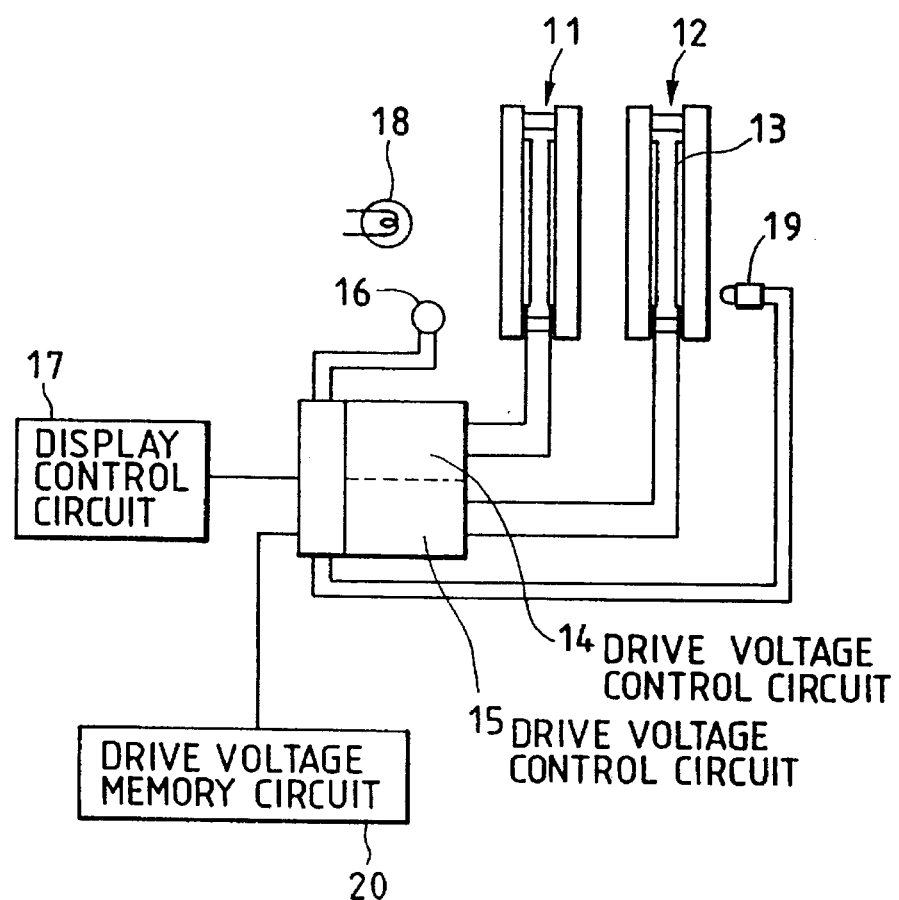
FIG. 8 is an explanatory diagram showing the arrangement of another liquid crystal display system, which constitutes a second embodiment of the invention.

As is apparent from comparison of FIGS. 3 and 8, the second embodiment is obtained by adding a drive voltage memory circuit 20 to the first embodiment described above.

The liquid crystal display system operates as follows: Similarly as in the case of the first embodiment shown in FIG. 3, when the liquid crystal display device 11 is driven, the ambient temperature of the latter 11 is detected with the temperature sensor 16. On the other hand, while the luminance measuring region 11B of the liquid crystal display device 11 being turned on and off with a suitable period, the contrast thereof is measured with the photo sensor 19, and the drive voltages applied to the liquid crystal display device 11 and the compensating liquid crystal device 12 are changed until liquid crystal panel drive voltages are obtained which make the contrast maximum. Furthermore, in the second embodiment, the liquid crystal drive voltages thus obtained are stored in the drive voltage memory circuit 20.

In addition, the drive voltages, which make the contrast maximum with respect to each ambient temperature of the liquid crystal display device, are stored in the drive voltage memory circuit 20 in a renewal mode.

The drive voltages thus stored are used as initial drive voltages when the liquid crystal display system is driven later, so that the highest contrast can be quickly and automatically obtained. This feature is effective in practical use as follows: In the case where the display is made with the luminance of the light source reduced for instance at night, it is difficult to accurately detect the luminance of the luminance measuring region, especially when it is in "off" state (in dark state), as a result of which the calculation of the contrast is greatly lowered in accuracy, which makes it impossible to control the drive voltages according to the result of the calculation. In this case, the latest drive voltage data corresponding to the present temperature are read out of the drive voltage memory circuit 20, so that suitable drive voltages are applied to the liquid crystal display device 11 and the compensating liquid crystal device 12. Thus, even when the display is made with a small quantity of light, its most suitable contrast can be quickly obtained.

As was described above, in the double-layer type super-twisted nematic liquid crystal display system including: the dot-matrix type liquid crystal display device 11 for displaying characters and/or graphic forms; and the compensating liquid crystal device 12 for compensating the optical phase of the device 11, the compensating liquid crystal device 12 also has transparent electrodes for retardation adjustment.

The display system further includes: the temperature sensor 16 for detecting the temperature of an atmosphere in which the liquid crystal display device and the compensating liquid crystal device are set; the photo sensor 19 for measuring and calculating the display contrast of the liquid crystal display device; the drive voltage control circuits 14 and 15 for controlling drive voltages applied to the liquid crystal display device 11 and the compensating liquid crystal device 12; and the displaying light source 18. In the display system thus organized, drive voltages applied to the liquid crystal display device 11 and the compensating liquid crystal device 12 are adjusted according to the calculation of contrast. Hence, even if the liquid crystal display device 11 and the compensating liquid crystal device 12 are varied in characteristic when manufactured, or when used for a long time, or the ambient temperature of those devices 11 and 12 changes, the drive voltages applied to the devices 11 and 12 are adjusted according to those variations, so that the display is best in contrast at all times.

Furthermore, the double-layer type super-twisted nematic liquid crystal display system, according to another aspect of the invention, further includes: the memory circuit 20 for storing drive voltages applied to the liquid crystal display device and the compensating liquid crystal device with respect to the ambient temperatures of those devices. Hence, in the case where it is difficult to perform the contrast calculation because it is low in the quantity of light, the drive voltage data stored with respect to the temperatures are read out of the memory circuit 20 so that suitable drive voltages are applied to the liquid crystal display device 11 and the compensating liquid crystal device 12. That is, even when it is low in the quantity of light, the display is best in contrast. When the liquid crystal display device is operated again later, the drive voltage data stored in the memory circuit in a renewal mode may be employed as initial drive voltage data. Thus, in driving the liquid crystal display device again, the best contrast can be obtained quickly.

While there has been described in connection with the preferred embodiments of this invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A double-layer type super-twisted nematic liquid crystal display system comprising:

a dot-matrix type liquid crystal display device for displaying at least one of characters and graphic forms;

a compensating liquid crystal device, which has transparent electrodes for retardation adjustment, for compensating an optical phase of said liquid crystal display device;

a display control circuit for causing said liquid crystal display device to display at least one of characters and forms;

a temperature sensor for detecting a temperature of an atmosphere in which said liquid crystal display device and said compensating liquid crystal device are set, to provide an initial optimum value range for one or more drive voltages;

light detecting means for measuring and calculating a display contrast of said liquid crystal display device;

at least two drive voltage control circuits for controlling said drive voltages, said drive voltages applied to said liquid crystal display device and said compensating device; and a displaying light source, wherein said liquid crystal display device and said compensating liquid crystal device are driven with said drive voltages which are adjusted according to the calculation of contrast made with the aid of said light detecting means.

2. A double-layer type super twisted nematic liquid crystal display system according to claim 1, further comprising:

a voltage memory circuit for storing most recent values of said drive voltages while said system is an off state to provide initial drive voltage values for when said system is switched to an on state.

3. A double-layer type super-twisted nematic liquid crystal display system comprising:

a dot-matrix type liquid crystal display device for displaying at least one of characters and graphic forms;

a compensating liquid crystal device, which has transparent electrodes for retardation adjustment, for compensating an optical phase of said liquid crystal display device;

a display control circuit for causing said liquid crystal display device to display at least one of characters and forms;

a temperature sensor for detecting a temperature of an atmosphere in which said liquid crystal display device and said compensating liquid crystal device are set, to provide an initial optimum value range for one or more drive voltages:

light detecting means for measuring and calculating a display contrast of said liquid crystal display device;

drive voltage control circuits for controlling said drive voltages, said drive voltages applied to said liquid crystal display device and said compensating device; and a displaying light source, wherein said liquid crystal display device and said compensating liquid crystal device are driven with said drive voltages which are adjusted according to the calculation of contrast made with the aid of said light detecting means and said liquid crystal display has a luminance measuring region which is turned on and off for measurement of the contrast of said liquid crystal display device.

4. A double layer type super-twisted nematic liquid crystal display system comprising:

a dot-matrix type liquid crystal display device for displaying at least one of characters and graphic forms;

a compensating liquid crystal device, which has transparent electrodes for retardation adjustment, for compensating an optical phase of said liquid crystal display device;

a display control circuit for causing said liquid crystal display device to display at least one of characters and forms;

a temperature sensor for detecting a temperature of an atmosphere in which said liquid crystal display device and said compensating liquid crystal device are set, to provide an initial optimum value range for one or more drive voltages;

light detecting means for measuring and calculating a display contrast of said liquid crystal display device;

drive voltage control circuits for controlling said drive voltages, said drive voltages applied to said liquid crystal display device and said compensating device; and a displaying light source, wherein said liquid crystal display device and said compensating liquid crystal device are driven with said drive voltages which are adjusted according to the calculation of contrast made with the aid of said light detecting means and said liquid crystal display device has a luminance measuring region which is divided into two parts which are alternately turned on and off for measurement of the contrast of said liquid crystal display device.

5. A double layer type super-twisted nematic liquid crystal display system comprising:

a dot-matrix type liquid crystal display device for displaying at least one of characters and graphic forms;

a compensating liquid crystal device, which has transparent electrodes for retardation adjustment, for compensating an optical phase of said liquid crystal display device;

a display control circuit for causing said liquid crystal display device to display at least one of characters and forms;

a temperature sensor for detecting a temperature of an atmosphere in which said liquid crystal display device and said compensating liquid crystal device are set, to provide an initial optimum value range for one or more drive voltages;

light detecting means for measuring and calculating a display contrast of said liquid crystal display device;

drive voltage control circuits for controlling said drive voltages, said drive voltages applied to said liquid crystal display device and said compensating device; and a memory circuit for storing data on drive voltages applied to said liquid crystal display device and said compensating liquid crystal device with respect to the temperatures thus detected; and a displaying light source, wherein the drive voltages applied to said liquid crystal display device and said compensating liquid crystal device are adjusted according to the calculation of contrast made with the aid of said light detecting means, and when a quantity of light required for the calculation of light required for the calculation of contrast is insufficient, the data on drive voltages stored in said memory circuit are selectively utilized to drive said liquid crystal display device and said compensating liquid crystal device.

6. The liquid crystal display system as claimed in claim 5, wherein said liquid crystal display device has a luminance measuring region which is turned on and off for measurement of the contrast of said liquid crystal display device.

7. The liquid crystal display system as claimed in claim 5, wherein said liquid crystal display device has a luminance measuring region which is divided into two parts which are alternately turned on and off for measurement of the contrast of said liquid crystal display device.

* * * * *